(12) United States Patent
Koo et al.

(10) Patent No.: US 11,782,540 B2
(45) Date of Patent: Oct. 10, 2023

(54) FRONT BUFFER RENDERING FOR VARIABLE REFRESH RATE DISPLAY

(71) Applicant: ATI TECHNOLOGIES ULC, Markham (CA)

(72) Inventors: Anthony W L Koo, Markham (CA); Syed Athar Hussain, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 115 days.

(21) Appl. No.: 17/029,721

(22) Filed: Sep. 23, 2020

(65) Prior Publication Data

US 2021/0407467 A1 Dec. 30, 2021

Related U.S. Application Data

(60) Provisional application No. 63/044,525, filed on Jun. 26, 2020.

(51) Int. Cl.
*G06F 3/041* (2006.01)
*G09G 5/393* (2006.01)
*G09G 5/399* (2006.01)
*G09G 5/36* (2006.01)

(52) U.S. Cl.
CPC .......... *G06F 3/0412* (2013.01); *G09G 5/393* (2013.01); *G09G 5/363* (2013.01); *G09G 5/399* (2013.01); *G09G 2340/0435* (2013.01); *G09G 2354/00* (2013.01); *G09G 2360/18* (2013.01)

(58) Field of Classification Search
CPC ...... G06F 3/0412; G09G 5/393; G09G 5/363; G09G 5/399; G09G 2340/0435; G09G 2354/00; G09G 2360/18
USPC .......................................................... 345/539
See application file for complete search history.

(56) References Cited

U.S. PATENT DOCUMENTS 9,529,463 B1 * 12/2016 Ramani .................... G09G 5/12
2017/0193971 A1 * 7/2017 Bi ............................ G09G 5/18

* cited by examiner

*Primary Examiner* — James A Thompson
*Assistant Examiner* — Kim Thanh T Tran

(57) ABSTRACT

A processing system reduces latency and improves predictability of a scan out position to support graphics processing unit (GPU) front buffer rendering with a variable refresh rate (VRR) display. The GPU detects whether front buffer rendering such as inking is occurring on a frame-by-frame basis. In order to maintain a safe distance from the current scan out position and achieve low latency to improve the user experience, the GPU increases the refresh rate of the VRR display to a low-latency (high-frequency) fixed refresh rate in response to detecting front buffer rendering. In some embodiments, the GPU decreases the refresh rate in response to detecting a static screen to save power.

19 Claims, 5 Drawing Sheets

FRONT BUFFER RENDERING FOR VARIABLE REFRESH RATE DISPLAY

CROSS-REFERENCE TO RELATED APPLICATIONS

The present application claims priority to Provisional Patent Application Ser. No. 63/044,525, entitled "Front Buffer Rendering for Variable Refresh Rate Display" and filed on Jun. 26, 2020, the entirety of which is incorporated by reference herein.

BACKGROUND

A typical processing system employs a graphics processing unit (GPU) to generate images for display. Based on information received from a central processing unit (CPU) or other processing unit, the GPU generates a series of frames and renders the series of frames for a display, such as a computer monitor. Processing systems typically employ multiple buffering for outputting frames to the display, such that the GPU is writing a frame to one buffer (referred to as the back buffer) while a current frame is being scanned out from another buffer (referred to as the front buffer). Once the new frame is ready for display, the GPU "flips" the buffer that is being scanned out to the display such that the buffer that had been the back buffer is now the front buffer (i.e., the scan out buffer), and the buffer that had previously been the scan out buffer is now the back buffer (i.e., the buffer to which the GPU writes).

The rate at which the series of frames can be displayed is governed by two different timing factors: the rate at which the GPU generates frames and the refresh rate of the display. Some processing systems improve the user experience by synchronizing the display refresh with the generation of frames at the GPU such that the refresh rate of the display is variable. For example, by adjusting a blanking interval of the display, the processing system can ensure that the display is refreshed at or near the time that a new frame is fully written to the back buffer and is ready for display at the GPU. However, for applications requiring low display latency, such as digital inking applications, conventional display synchronization techniques can cause visual artifacts and other issues that result in a poor user experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
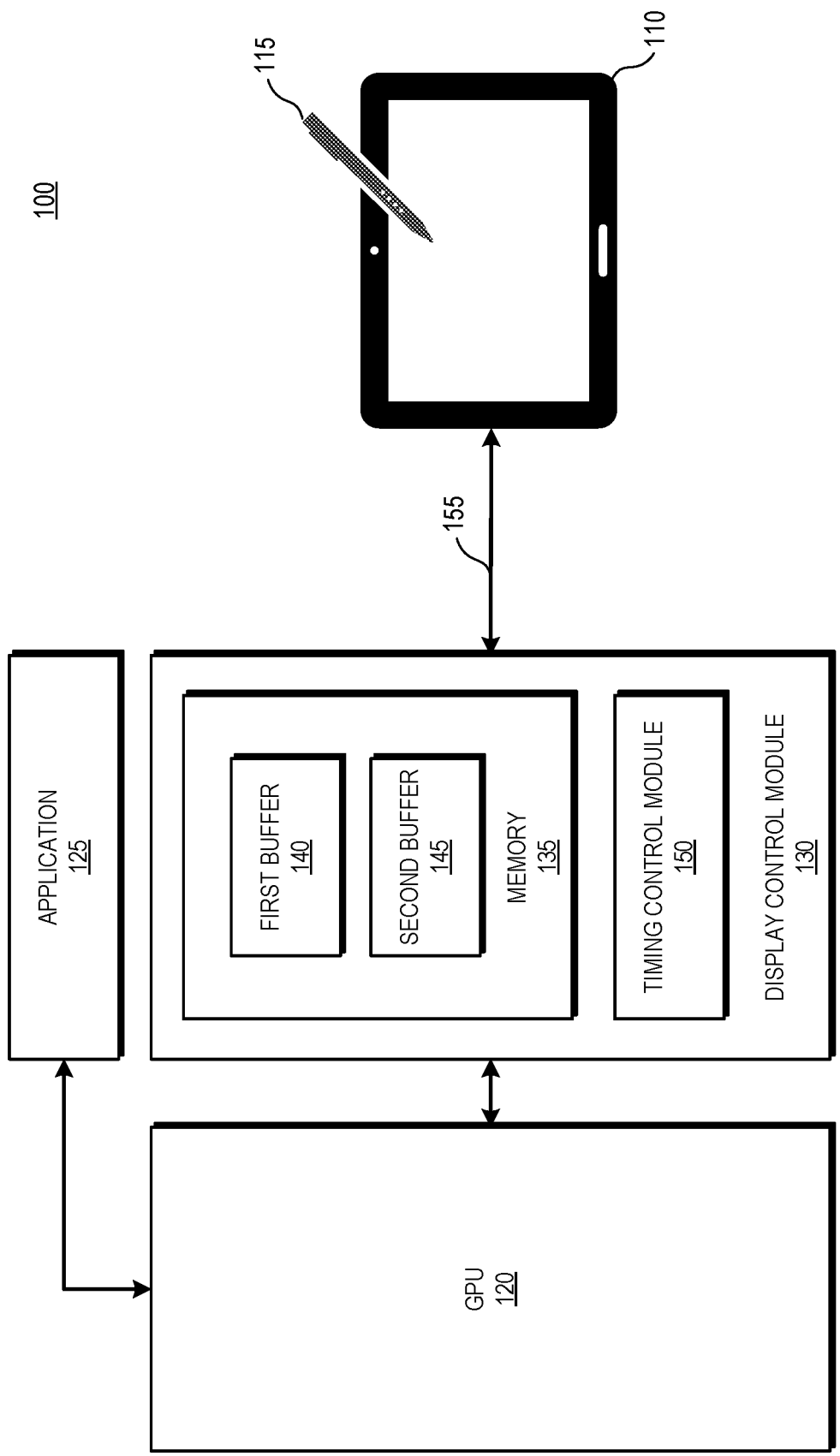
FIG. 1 is a block diagram of a block diagram of a processing system configured to adjust a refresh rate of a variable refresh rate (VRR) display to accommodate front buffer rendering in accordance with some embodiments.

FIGS. 1-6 illustrate techniques for reducing latency and improving predictability of a scan out position to support graphics processing unit (GPU) front buffer rendering with variable refresh rate (VRR) displays. Applications such as GPU accelerated inking, in which a user writes with a stylus or other tool on a touch device display screen, require low latency so that user pen strokes appear on the screen with as little delay as possible. To minimize delay, rather than using a double (or other multiple) buffering scheme, the application renders directly to the front buffer as the front buffer is being scanned out so the pen strokes appear sooner than they would if the GPU rendered to the back buffer and waited for the next buffer flip. The GPU detects whether a front buffer rendering application such as inking is being executed on a frame-by-frame basis.

If the application or the GPU were to write to a portion of the front buffer while the portion is being output to the display, visual artifacts could occur. In order to maintain a distance sufficiently separated from the current scan out position so that the portion being written to is not being concurrently scanned out and achieve low latency to improve the user experience, the GPU increases the refresh rate of the VRR display to a low-latency (high-frequency) rate in response to detecting front buffer rendering. In some embodiments, the GPU increases the refresh rate by reducing a vertical blanking interval between frames. The GPU sets the increased refresh rate as a fixed refresh rate so that a current memory location that is being output to the display (i.e., the current scan out position of the front buffer) is predictable. During inking to the VRR display, the application or the GPU writes to the front buffer behind the predicted current scan out position.

Either the GPU or the application performing front buffer rendering determines when the application can safely render to the front buffer behind the predicted current scan out position. For embodiments in which the application determines when it is safe to render to the front buffer, the application determines which part of the frame the GPU is currently transmitting to the display device. Typically, the GPU scans out the frame line by line, starting from left to right and from top to bottom. In some embodiments, the application queries the GPU for the current scan out line and determines how close the current scan out line is to the part of the frame to which the application is trying to render. If the current scan out line is within a threshold distance from the part of the frame to which the application is trying to render, the application waits until the GPU finishes scanning out the line before rendering new data to the line. In some embodiments, the application estimates the current scanout line based on a periodic VSync event generated by the GPU. The GPU typically generates a Vsync event once per frame near the start of a frame, and the application estimates which part of the frame is being scanned out based on how much time has passed since the most recent Vsync event occurred.

In some embodiments, The GPU and the application performing the front buffer rendering together determine a fixed refresh rate to use while front buffer rendering is active. The application can more accurately estimate the current scan out position of the frame based on the refresh rate. In other embodiments in which the application performing the front buffer rendering is not explicitly aware of the refresh rate, the application determines the refresh rate by measuring the period of time between VSync events that are emitted by the GPU. The front buffer rendering is then output to the VRR display without having to wait for the next scan out cycle (i.e., for the next full frame to be rendered).

When the GPU detects no further inking activity, the GPU reduces the refresh rate to conserve power. In some embodiments, in response to detecting no further inking activity and further in response to not receiving a signal to perform a buffer flip between the front buffer and the back buffer within a period of time (i.e., in response to detecting a static screen), the GPU reduces the refresh rate to a rate that is lower than a nominal refresh rate range for the VRR display. The maximum period of time that a VRR display can display each frame depends on the frame content and the VRR display technology. In some embodiments, in response to detecting a static screen, the GPU queries the VRR display on a frame-by-frame basis to determine how long the VRR display can display the current frame before refreshing. The GPU receives a response from the VRR display indicating how long the VRR display and display the current frame and then reduces the refresh rate to a frequency based on the response.

FIG. 1 illustrates a processing system 100 configured to support front buffer rendering with a VRR display 110. The processing system 100 is generally configured to execute sets of instructions (e.g., computer programs) such as application 125 to carry out specified tasks for an electronic device. Examples of such tasks include controlling aspects of the operation of the electronic device, displaying information to a user to provide a specified user experience, communicating with other electronic devices, and the like. Accordingly, in different embodiments the processing system 100 is employed in one of a number of types of electronic device, such as a desktop computer, laptop computer, server, game console, tablet, smartphone, and the like.

To support execution of the sets of instructions, the processing system 100 includes a plurality of processor cores (not shown in FIG. 1). In some embodiments, each processor core includes one or more instruction pipelines to fetch instructions, decode the instructions into corresponding operations, dispatch the operations to one or more execution units, execute the operations, and retire the operations. In the course of executing instructions, the processor cores generate graphics operations and other operations associated with the visual display of information. Based on these operations, the processor cores provide commands and data to a graphics processing unit (GPU) 120, illustrated in FIG. 1.

The GPU 120 is generally configured to receive the commands and data associated with graphics and other display operations from the plurality of processor cores. Based on the received commands, the GPU 120 executes operations to generate frames for display. Examples of operations include vector operations, drawing operations, and the like. The rate at which the GPU 120 is able to generate frames based on these operations is referred to as the frame generation rate, or simply the frame rate, of the GPU 120. It will be appreciated that the frame rate varies over time, based in part on the complexity of the operations executed by the GPU 120 to generate a set of frames. For example, sets of frames requiring a relatively high number of operations (as a result of drawing a relatively large number of moving objects, for example) are likely to result in a lower frame rate, whereas sets of frames requiring a relatively low number of operations are likely to allow for a higher frame rate.

To display frames, the processing system 100 includes a display control module 130 and a VRR display 110. The VRR display 110 is a display device generally configured to visually display images based on the frames generated by the GPU 120. Accordingly, in different embodiments the VRR display 110 is a liquid crystal display (LCD) device, an organic light-emitting diode (OLED) device, and the like. As will be appreciated by one skilled in the art, the display control module 130 is generally configured to periodically display the most recent frame generated by the GPU 120 by refreshing the display 110 using the pixel data that the display control module 130 receives. Each frame render is associated with a period of time, referred to as a blanking interval, during which the VRR display 110 continues displaying the last frame that was transmitted by the GPU 120. The VRR display 110 is configured to have a blanking interval of variable length that is programmable by the GPU 120. The display control module 130 starts refreshing the VRR display 110 with new frame contents as the GPU 120 ends the vertical blanking interval and starts outputting the new frame. Accordingly, as described further herein, the refresh rate of the VRR display 110 is adjustable by programming different lengths for the blanking interval. In some embodiments the VRR display 110 is connected to the display control module 130 via an auxiliary port (AUX) 155.

The display control module 130 is generally configured to control the display of frames at the VRR display 110. The display control module 130 is implemented as hard-coded or programmable logic, one or more processors executing software/firmware instructions, or any combination thereof. In some embodiments, the display control module 130 performs operations including buffering of frames generated by the GPU 120, adjustment of the refresh rate of the VRR display 110 by programming different blanking interval lengths, and the like. It will be appreciated that although the display control module 130 is illustrated as a separate module from the GPU 120 for ease of illustration, in some embodiments the display control module 130 is incorporated in the GPU 120. In other embodiments, one or more operations of the display control module 130 are performed at the VRR display 110.

The display control module 130 includes a memory 135 and a timing control 150. The memory 135 includes a plurality of regions, one of which is designated as a first buffer 140 and another of which is designated as a second buffer 145. Content for display that is generated or rendered by the GPU 120 is stored in one of the first buffer 140 and the second buffer 145. The first buffer 140 and the second buffer 145 work in tandem in a double buffering scheme. Under this scheme, one of the first buffer 140 and the second buffer 145 holds the rendered content that is currently displayed at the VRR display 110, and is typically referred to as the front buffer. The other buffer, typically referred to as the back buffer, holds rendered content that is waiting to be displayed at the next appropriate time. When the application 125 determines that the back buffer content should be displayed, the application 125 performs a "flip", meaning that the display switches to scanning out and displaying the contents of what was formerly the back buffer (now referred to as the front buffer) while the GPU 120 switches to modifying the contents of what was formerly the front buffer (now referred to as the back buffer). The VRR display 110 has an adjustable frame rate that varies based on when content at the back buffer is ready to be displayed.

Some applications require modified content to appear at the VRR display 110 at a faster rate than the double buffering scheme can achieve. For example, in an "inking" scenario in which a user writes on a touch screen of the VRR display 110 using a stylus 115, the user's experience is enhanced if the user's pen strokes appear on the VRR display 110 sooner than if the processing system 100 waits for the application 125 to signal that rendering of the next frame at the back buffer is complete and ready for the next flip. However, because the refresh rate of a VRR display changes on a frame-by-frame basis, writing to the front buffer as the front buffer is being scanned out to the VRR display 110 carries a risk that the application 125 or the GPU 120 will modify a portion of the front buffer that is ahead of the line that is currently being scanned out, which can create visual artifacts that negatively impact the user experience.

To facilitate front buffer rendering to a VRR display 110, the processing system 110 includes a timing control module 150 configured to modify the refresh rate of the VRR display 110 to have a predictable current scan out position and low latency. In response to detecting front buffer rendering activity, the timing control module dynamically increases the refresh rate of the VRR display 110 to a fixed, low-latency refresh rate. The increased refresh rate reduces the latency between the user moving the stylus 115 along the VRR display 110 and the mark caused by the inking appearing on the VRR display 110. In addition, by setting the refresh rate to a fixed refresh rate, the timing control module 150 enables the application 125 to predict the current scan out position of the front buffer. Based on the predicted current scan out position, the application 125 (or, in some embodiments, the GPU 120) determines a safe margin behind the current scan out position and writes to the front buffer within the safe margin behind the current scan out location in response to inputs from the stylus 115.

Once the application 125 or the GPU 120 detects that front buffer rendering activity has ceased, the GPU 120 signals the timing control module 150 to resume a variable refresh rate. In some embodiments, the timing control module 150 sets the refresh rate to resume a lower refresh rate to conserve power in response to detecting that front buffer rendering activity has ceased.

To further save power during periods of time when there is no detected front buffer rendering activity and no buffer flips are occurring (i.e., the displayed content is static), in some embodiments the timing control module 150 implements a dynamic minimum refresh rate that is dependent on the displayed content. A typical VRR display is capable of refreshing at rates within a fixed range. For example, a typical VRR display can support 48-144 Hz, meaning that there is a requirement for the GPU 120 to output frames for display at a rate no slower than 48 Hz. If the content does not change for a period of time that is longer than the slowest refresh rate, the GPU 120 re-outputs the current frame of data. In response to detecting no front buffer rendering activity and receiving no signal to perform a buffer flip within a period of time after the VRR display 110 was most recently refreshed, the timing control module 150 queries the VRR display 110 to determine how long the VRR display 110 can hold the current frame before another refresh cycle is needed. In some embodiments, the timing control module 150 queries the VRR display 110 via the AUX 155. The timing control module 150 sets the refresh rate for the current frame to refresh at a frequency based on how long the VRR display 110 can display the current frame before refreshing.

Figure 2:
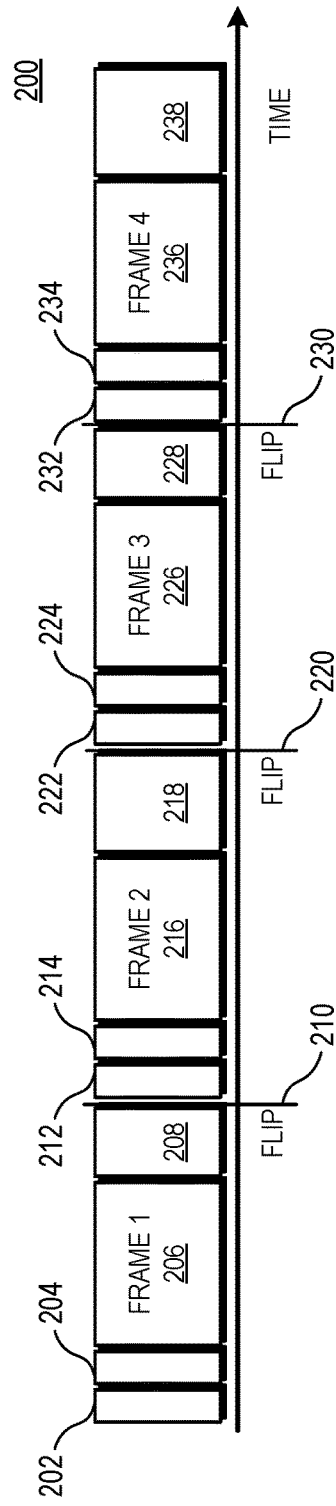
FIG. 2 is a diagram illustrating an example of the processing system of FIG. 1 adjusting the refresh rate of the VRR display based on flip events in accordance with some embodiments.

FIG. 2 is a diagram illustrating an example of the processing system of FIG. 1 adjusting the refresh rate of the VRR display based on flip events in accordance with some embodiments. A first active frame, frame 1 206, is preceded by transmission from the display control module 130 to the VRR display 110 of a blanking region of fixed size that in some embodiments includes a vertical sync (VSYNC) 202 and a back porch 204. The VSYNC 202 signals the start of a new active frame and the back porch 204 includes metadata such as specifying a color gamut that informs the VRR display 110 how to render the frame 206. Frame 1 206 is scanned out from the current front buffer, which for purposes of illustration will be considered to be the first buffer 140. Typically, the active frame is scanned out beginning at the top left of the VRR display 110 and ending at the bottom right of the VRR display 110. Once the active frame, frame 1 206, has been fully scanned out to the VRR display 110, the display control module 130 transmits a blanking region of variable size referred to as a front porch 208. The size of the front porch 208 determines the refresh rate of the VRR display 110.

At time 210, the application 125 signals a flip in response to the GPU 120 completing rendering the next frame (frame 2 216) to the back buffer. The display control module 130 switches to scanning out from the new front buffer, second buffer 145 (which had previously been the back buffer), and outputs a VSYNC 212 signaling the start of a new frame and back porch 214 including metadata specific to the next frame, followed by the next active frame, frame 2 216. Based on the complexity of the frame following frame 2 216 and the instructions of the application 125, the timing control module 130 determines the size of a front porch 218 that follows frame 2 216.

At time 220, the application 125 signals a flip in response to the GPU 120 completing rendering the next frame (frame 3 226) to the current back buffer, first buffer 140. The display control module 130 switches to scanning out from the first buffer 140 and outputs a VSYNC 222 signaling the start of a new frame and back porch 224 including metadata specific to the next frame, followed by the next active frame, frame 3 226. Based on the complexity of the frame following frame 3 226 and the instructions of the application 125, the timing control module 130 determines the size of a front porch 228 that follows frame 3 226.

At time 230, the application 125 signals a flip in response to the GPU 120 completing rendering the next frame (frame 4 236) to the current back buffer, second buffer 145. The display control module 130 switches from scanning out from the second buffer 145 and outputs a VSYNC 232 signaling the start of a new frame and back porch 234 including metadata specific to the next frame, followed by the next active frame, frame 4 236. Based on the complexity of the frame following frame 4 236 and the instructions of the application 125, the timing control module 130 determines the size of a front porch 238 that follows frame 4 236. As can be seen, the sizes of the front porches 208, 218, 228, 238 vary from one another such that the refresh rate of the VRR display changes from one frame to the next. The variable refresh rate makes the current scan out position of the active frame difficult to predict.

Figure 3:
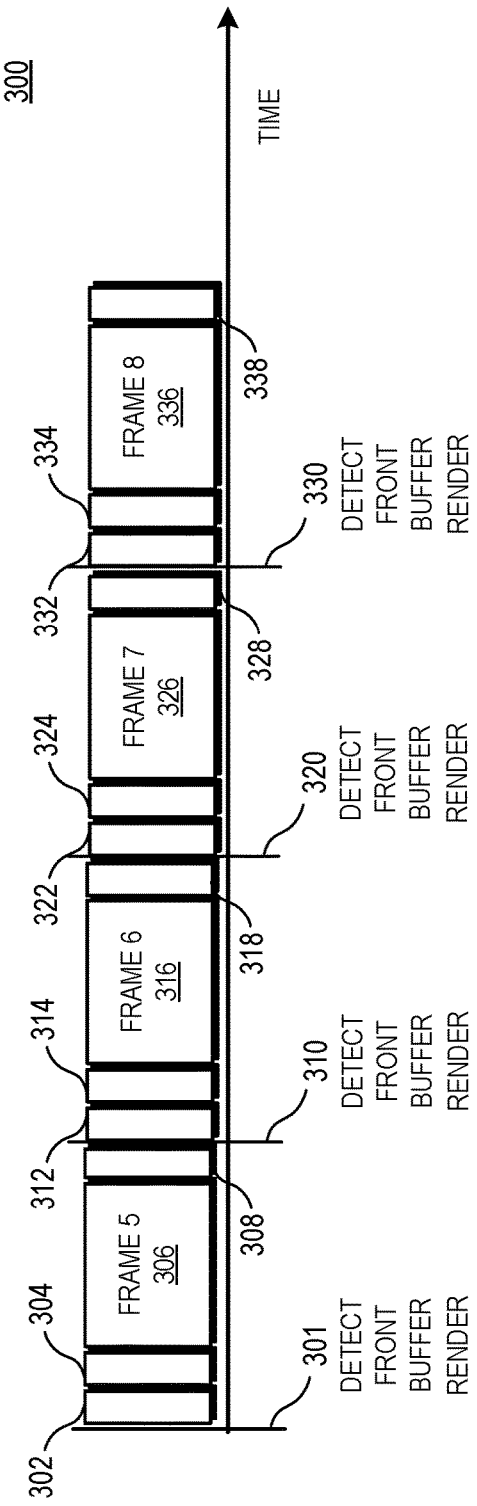
FIG. 3 is a diagram illustrating an example of the processing system of FIG. 1 increasing the refresh rate of the VRR display to a fixed refresh rate based on detection of front buffer rendering in accordance with some embodiments.

FIG. 3 is a diagram illustrating an example of the processing system of FIG. 1 increasing the refresh rate of the VRR display to a fixed refresh rate based on detection of front buffer rendering in accordance with some embodiments. At time 301, the GPU 120 detects front buffer rendering activity such as touch screen interaction with the stylus 115 (inking) by receiving an indication of inking from the application 125 or detecting a graphics submission to modify the contents of the front buffer while the front buffer is being scanned out to the VRR display 110. The initiation of inking signals the GPU 120 to replay the current active frame with modifications based on the pen strokes of the stylus 115 or other writing instrument such as a pen, finger, pointer, touchpad, or cursor movements.

To reduce latency and increase predictability of a current scan out position in response to detecting front buffer rendering activity, the timing control module 150 sets the refresh rate of the VRR display 110 to a low-latency fixed refresh rate. In the illustrated embodiment, the timing control module 150 reduces the size of the front porch 308 portion of the blanking interval for the current active frame, frame 5 306, and sets the size of the front porch 308 to a fixed size. The display control module 130 outputs a VSYNC 302 signaling the start of a new frame and back porch 304 including metadata specific to the frame, and scans out the current frame, frame 5 306, from the front buffer (for purposes of illustration, still the second buffer 145 that output the most recent frame, frame 4 236, in FIG. 2) while modifying the contents of the second buffer 145 a safe margin behind the current scan out position of the second buffer 145. The timing control module 150 outputs the fixed, reduced-size front porch 308.

At time 310, the GPU 120 detects continued front buffer rendering and the timing control module 150 reduces the size of the front porch 318 portion of the blanking interval for the current active frame, frame 6 316, to the same reduced fixed size as the front porch 308. The display control module 130 outputs a VSYNC 312 and back porch 314 followed by the current frame, frame 6 316, from the second buffer 145 while the GPU 120 continues to modify the second buffer 145 based on inputs from the inking a safe margin behind the current scan out position of the second buffer 145. In some embodiments, the current frame 6 316 is the same frame as frame 5 306, with modifications resulting from inking activity. The timing control module 150 outputs the fixed, reduced-size front porch 318 once the current active frame 6 316 has fully scanned out to the VRR display 110.

Similarly, at time 320, the GPU 120 detects continued front buffer rendering and the timing control module 150 reduces the size of the front porch 328 portion of the blanking interval for the current active frame, frame 7 326, to the same reduced fixed size as the front porches 308, 318. The display control module 130 outputs a VSYNC 322 and back porch 324 followed by the current frame, frame 7 326, from the second buffer 145 while the GPU 120 continues to modify the second buffer 145 based on inputs from the inking a safe margin behind the current scan out position of the second buffer 145. In some embodiments, the current frame 7 326 is the same frame as frame 5 306 and frame 6 316, with further modifications resulting from inking activity. The timing control module 150 outputs the fixed, reduced-size front porch 328 once the current active frame 7 326 has fully scanned out to the VRR display 110.

Again at time 330, the GPU 120 detects continued front buffer rendering and the timing control module 150 reduces the size of the front porch 338 portion of the blanking interval for the current active frame, frame 8 336, to the same reduced fixed size as the front porches 308, 318, 328. The display control module 130 outputs a VSYNC 332 and back porch 334 followed by the current frame, frame 8 336, from the second buffer 145 while the GPU 120 continues to modify the second buffer 145 based on inputs from the inking a safe margin behind the current scan out position of the second buffer 145. In some embodiments, the current frame 8 336 is the same frame as frame 5 306, frame 6 316, and frame 7 326, with further modifications resulting from inking activity. The timing control module 150 outputs the fixed, reduced-size front porch 338 once the current active frame 8 336 has fully scanned out to the VRR display 110. As can be seen, the sizes of the front porches 308, 318, 328, 338 do not vary from one another such that the refresh rate of the VRR display remains fixed from one frame to the next. The fixed refresh rate makes the current scan out position of the active frame predictable. In addition, the reduced sizes of the front porches 308, 318, 328, 338 results in reduced latency to improve the user experience during inking.

Figure 4:
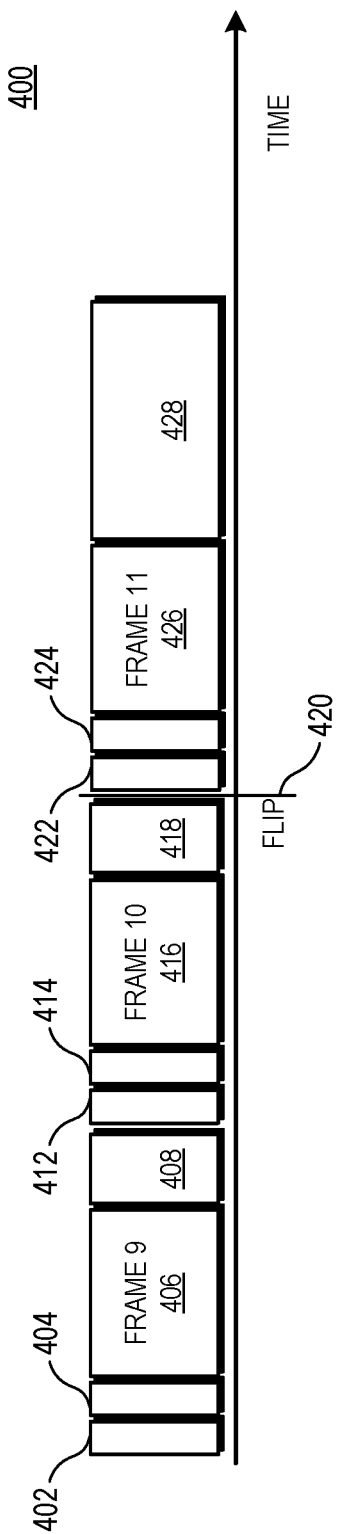
FIG. 4 is a diagram illustrating an example of the processing system of FIG. 1 reducing the refresh rate of the VRR display to a low variable refresh rate based on detection of no flip events or front buffer rendering in accordance with some embodiments.

FIG. 4 is a diagram illustrating an example of the processing system of FIG. 1 reducing the refresh rate of the VRR display 110 to a low variable refresh rate based on detection of no flip events and no front buffer rendering in accordance with some embodiments. Typically, in the absence of a flip event or front buffer rendering, the GPU 120 re-outputs the current frame of data, as illustrated with frame 9 406 and frame 10 416, which are the same frame of data. Frame 9 406 is preceded by a VSYNC 402 and back porch 404 and is followed by a front porch 408 of nominal size to maintain a nominal refresh rate. Similarly, frame 10 416 is preceded by a VSYNC 412 and back porch 414 and is followed by a front porch 418 of variable size based on initiation of a flip at time 420 by the application 125.

Following the flip at time 420, the GPU 120 detects a static screen due to no inking or flip activity. Because no new content is ready to be displayed, the timing control module 150 implements a dynamic minimum refresh rate. In response to detecting no front buffer rendering activity and receiving no signal to perform a buffer flip within a period of time after the VRR display 110 was most recently refreshed at time 420, the timing control module 150 queries the VRR display 110 to determine how long the VRR display 110 can hold the current frame, frame 11 426 before another refresh cycle is needed. In some embodiments, the timing control module 150 queries the VRR display 110 via the AUX 155. The timing control module 150 sets the refresh rate for the current frame by extending the front porch 428 to refresh at a frequency based on how long the VRR display 110 can display the current frame before refreshing. In some embodiments, the dynamic minimum refresh rate set by the timing control module 150 in response to a static screen is lower than a nominal minimum refresh rate of the VRR display 110.

Figure 5:
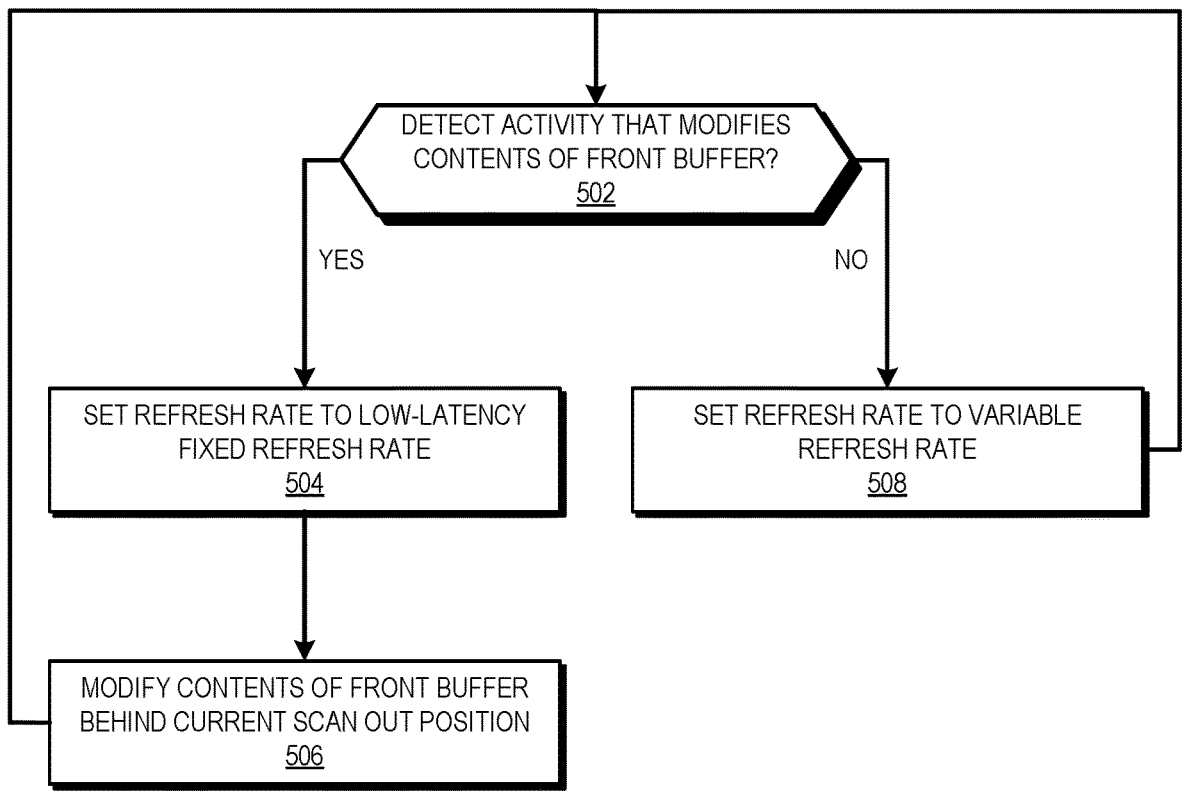
FIG. 5 is a flow diagram of a method of a graphics processing unit increasing the refresh rate of a VRR display to a fixed refresh rate based on detection of front buffer rendering in accordance with some embodiments.

FIG. 5 is a flow diagram of a method of a graphics processing unit increasing the refresh rate of a VRR display to a fixed refresh rate based on detection of front buffer rendering in accordance with some embodiments. At block 502, the GPU 120 determines whether it detects activity that modifies the contents of the front buffer while the front buffer is being scanned out to the VRR display 110. If, at block 502, the GPU 120 detects activity that modifies the contents of the front buffer, the method flow continues to block 504. At block 504, the timing control module 150 sets the refresh rate of the VRR display 110 to a low-latency fixed refresh rate. In some embodiments, the timing control module 150 sets the low-latency fixed refresh rate by reducing the size of the front porch portion of the blanking interval and setting the front porch to a fixed size. Based on the low-latency fixed refresh rate, the GPU 120 can determine a safe margin behind the current scan out position of the front buffer to modify the contents of the front buffer while the front buffer is being scanned out. At block 506, the GPU 120 modifies the contents of the front buffer behind the current scan out position.

If, at block 502, the GPU 120 does not detect activity that modifies the contents of the front buffer, the method flow continues to block 508. At block 508, the timing control module 150 sets the refresh rate to a variable refresh rate based on when the contents of the back buffer will be fully rendered and ready for output to the VRR display 110.

Figure 6:
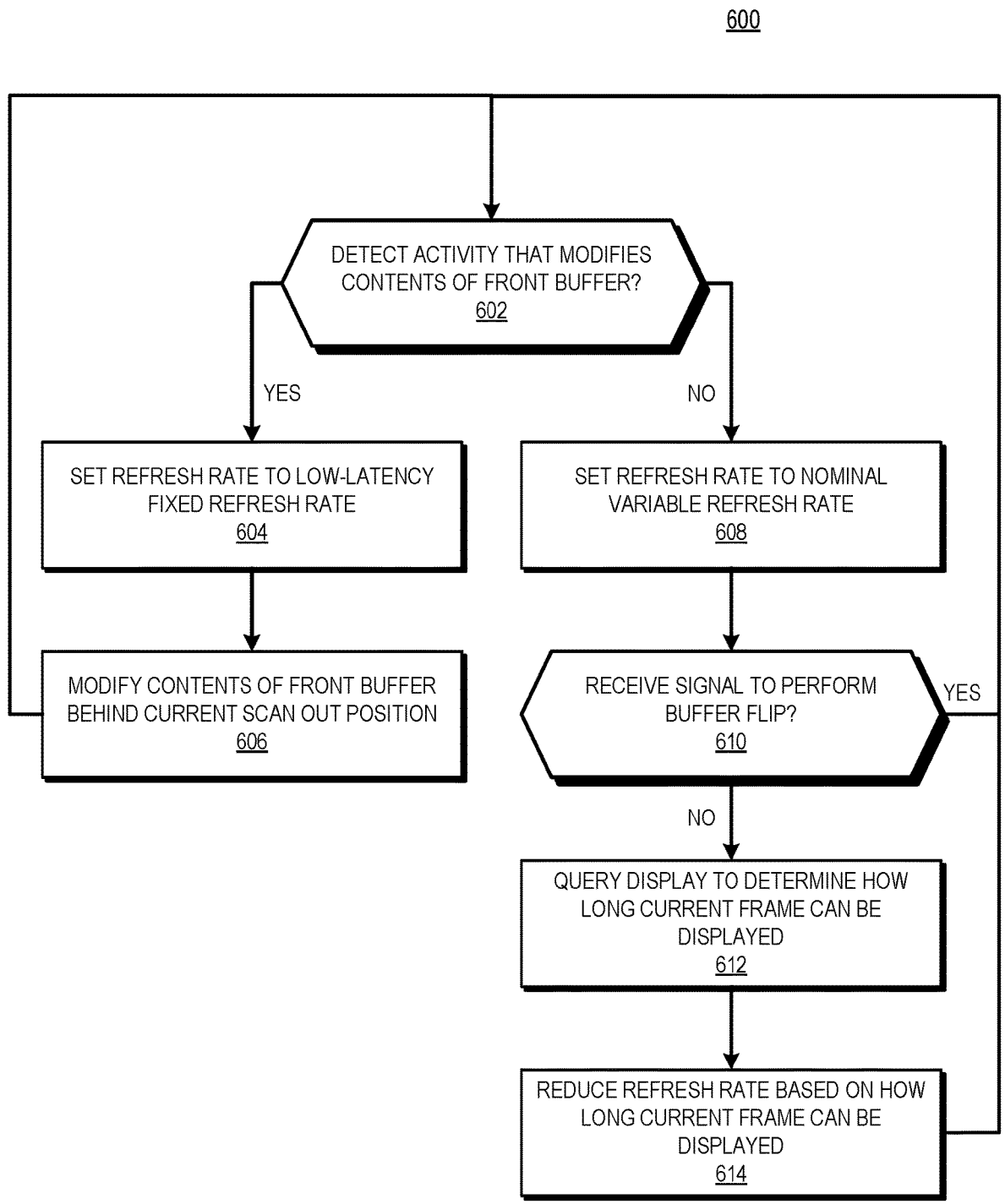
FIG. 6 is a flow diagram of a method of a graphics processing unit decreasing the refresh rate of a VRR display to a low variable refresh rate based on detection of no flip events or front buffer rendering in accordance with some embodiments.

FIG. 6 is a flow diagram of a method of a graphics processing unit decreasing the refresh rate of a VRR display to a low variable refresh rate based on detection of no flip events or front buffer rendering in accordance with some embodiments. At block 602, the GPU 120 determines whether it detects activity that modifies the contents of the front buffer while the front buffer is being scanned out to the VRR display 110. If, at block 602, the GPU 120 detects activity that modifies the contents of the front buffer, the method flow continues to block 604. At block 604, the timing control module 150 sets the refresh rate of the VRR display 110 to a low-latency fixed refresh rate. In some embodiments, the timing control module 150 sets the low-latency fixed refresh rate by reducing the size of the front porch portion of the blanking interval and setting the front porch to a fixed size. Based on the low-latency fixed refresh rate, the GPU 120 can determine a safe margin behind the current scan out position of the front buffer to modify the contents of the front buffer while the front buffer is being scanned out. At block 606, the GPU 120 modifies the contents of the front buffer behind the current scan out position.

If, at block 602, the GPU 120 does not detect activity that modifies the contents of the front buffer, the method flow continues to block 608. At block 608, the timing control module 150 sets the refresh rate to a variable refresh rate based on when the contents of the back buffer will be fully rendered and ready for output to the VRR display 110. At block 610, the GPU 120 determines whether it has received a signal to perform a buffer flip. If, at block 610, the GPU 120 determines that it has received a signal to perform a buffer flip, the method flow continues back to block 602.

At block 610, if the GPU 120 determines that it has not received a signal to perform a buffer flip, the method flow continues to block 612. At block 612, the timing control module 150 queries the VRR display 110 to determine how long the VRR display 110 can hold the current frame before another refresh cycle is needed. In some embodiments, the timing control module 150 queries the VRR display 110 via the AUX 155. At block 614, the timing control module 150 reduces the refresh rate for the current frame to refresh at a frequency based on how long the VRR display 110 can display the current frame before refreshing. In some embodiments, the timing control module 150 reduces the refresh rate by extending the front porch portion of the blanking interval for the current frame.

In some embodiments, the apparatus and techniques described above are implemented in a system including one or more integrated circuit (IC) devices (also referred to as integrated circuit packages or microchips), such as the processing system described above with reference to FIGS. 1-6. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   setting a refresh rate of a variable refresh rate (VRR) display to a fixed refresh rate in response to detecting an access to a front buffer that modifies contents of the front buffer while the front buffer is being scanned out to the VRR display; and
   modifying a portion of the contents of the front buffer that is separated by a distance from a predicted current scan out position such that the portion being modified is not being concurrently scanned out to the VRR display.

2. The method of claim 1, further comprising:
   in response to detecting that the access to the front buffer has ceased, resuming a variable refresh rate.

3. The method of claim 1, further comprising:
   predicting a current scan out position based on the fixed refresh rate.

4. The method of claim 1, further comprising:
   detecting the access to the front buffer based on receiving an indication from an application.

5. The method of claim 1, wherein setting the refresh rate comprises reducing a blanking interval of the VRR display.

6. The method of claim 1, further comprising:
   reducing the refresh rate in response to:
     detecting no access to the front buffer that modifies the contents of the front buffer while the front buffer is being scanned out to the VRR display within a period of time after the VRR display was most recently refreshed; and
     receiving no signal to perform a buffer flip between the front buffer and a back buffer within the period of time.

7. The method of claim 6, further comprising:
   querying the VRR display to determine how long the VRR display can display a current frame before refreshing;
   receiving a response from the VRR display indicating how long the VRR display can display the current frame before refreshing; and
   reducing the refresh rate to a frequency based on the response.

8. A method, comprising:
   detecting an access to a front buffer that modifies contents of the front buffer while the front buffer is being scanned out to a variable refresh rate (VRR) display;
   setting a refresh rate of the VRR display to a fixed refresh rate in response to detecting the access to the front buffer;
   predicting a current scan out position of the front buffer based on the fixed refresh rate; and
   modifying a portion of the contents of the front buffer that is separated by a distance from the predicted current scan out position such that the portion being modified is not being concurrently scanned out to the VRR display.

9. The method of claim 8, further comprising:
   in response to detecting that the access to the front buffer has ceased, resuming a variable refresh rate.

10. The method of claim 8, wherein the access to the front buffer comprises modifying the contents of the front buffer in response to a user writing on a touch device display screen.

11. The method of claim 8, reducing the refresh rate in response to:
    detecting no access to the front buffer that modifies the contents of the front buffer while the front buffer is being scanned out to the VRR display within a period of time after the VRR display was most recently refreshed; and
    receiving no signal to perform a buffer flip between the front buffer and a back buffer within the period of time.

12. The method of claim 11, further comprising:
    querying the VRR display to determine how long the VRR display can display a current frame before refreshing;
    receiving a response from the VRR display indicating how long the VRR display can display the current frame before refreshing; and
    reducing the refresh rate to a frequency based on the response.

13. The method of claim 8, wherein increasing the refresh rate comprises reducing a blanking interval of the VRR display.

14. A processing system comprising:
    a graphics processing unit (GPU) configured to:
      detect an access to a front buffer that modifies contents of the front buffer while the front buffer is being scanned out to a variable refresh rate (VRR) display;
      set a refresh rate of the VRR display to a fixed refresh rate in response to detecting the access to the front buffer;
      predict a current scan out position of the front buffer based on the fixed refresh rate; and
      modify a portion of the contents of the front buffer that is separated by a distance from the predicted current scan out position such that the portion being modified is not being concurrently scanned out to the VRR display.

15. The processing system of claim 14, wherein the GPU is further to:
    signal the VRR display to resume a variable refresh rate in response to detecting that the access to the front buffer has ceased.

16. The processing system of claim 14, wherein the GPU is further to:
    reduce the refresh rate in response to:
      detecting no access to the front buffer that modifies the contents of the front buffer while the front buffer is being scanned out to the VRR display within a period of time after the VRR display was most recently refreshed; and receiving no signal to perform a buffer flip between the front buffer and a back buffer within the period of time.

17. The processing system of claim 16, wherein the GPU is further to:
query the VRR display to determine how long the VRR display can display a current frame before refreshing;
receive a response from the VRR display indicating how long the VRR display can display the current frame before refreshing; and
reduce the refresh rate to a frequency based on the response.

18. The processing system of claim 14, wherein the access to the front buffer comprises modifying the contents of the front buffer in response to a user writing on a touch device display screen.

19. The processing system of claim 14, wherein the GPU is further to:
increase the refresh rate by reducing a blanking interval of the VRR display.

* * * * *